(12) United States Patent
Chae et al.

(10) Patent No.: US 6,428,249 B1
(45) Date of Patent: Aug. 6, 2002

(54) METHOD OF MANUFACTURING DIAMOND CUTTING TOOLS THROUGH INSTANTANEOUS HEATING PROCESS AND COOLING PROCESS AND SUCH A DIAMOND CUTTING TOOL

(75) Inventors: Ki Woong Chae, Choongchungnamdo; Eoung Sik Min, Kyungkido, both of (KR)

(73) Assignee: Precision Diamond Co., Ltd., Choongchungnamdo (KR)

( * ) Notice: Subject to any disclaimer, the term of this patent is extended or adjusted under 35 U.S.C. 154(b) by 0 days.

(21) Appl. No.: 09/582,453

(22) PCT Filed: Nov. 1, 1999

(86) PCT No.: PCT/KR99/00653

§ 371 (c)(1),
(2), (4) Date: Sep. 13, 2000

(87) PCT Pub. No.: WO00/25975

PCT Pub. Date: May 11, 2000

(30) Foreign Application Priority Data

Nov. 2, 1998 (KR) .............................. 98-46732

(51) Int. Cl.[7] .......................... B23B 27/20; B24D 11/00
(52) U.S. Cl. ....................... 407/118; 407/119; 428/212; 428/698
(58) Field of Search ................ 407/118, 119; 427/229; 423/446; 428/212, 698; 408/144, 145

(56) References Cited

U.S. PATENT DOCUMENTS

| 5,155,336 | A | | 10/1992 | Gronet et al. ............... 219/411 |
| 5,516,500 | A | * | 5/1996 | Liu et al. .................... 423/446 |
| 5,639,285 | A | * | 6/1997 | Yao et al. ...................... 51/307 |
| 5,690,706 | A | * | 11/1997 | Sigalas et al. ................ 51/307 |
| 5,697,994 | A | * | 12/1997 | Packer et al. ................. 51/309 |
| 5,900,225 | A | * | 5/1999 | Mistry et al. ............... 423/446 |
| 6,068,913 | A | * | 5/2000 | Cho et al. ................... 428/212 |

FOREIGN PATENT DOCUMENTS

| EP | 0329955 | 8/1989 |
| JP | 3260029 | 11/1991 |

OTHER PUBLICATIONS

English Translation of JP 3260029 dated Nov. 20, 1991.

* cited by examiner

Primary Examiner—Henry Tsai
(74) Attorney, Agent, or Firm—Ladas & Parry

(57) ABSTRACT

The present method involves heating a blank, a shank and a welding material in an instantaneous heating process wherein a temperature instantaneously rises at a rate of 500–1000° C./min.; and cooling the blank and the shank at a temperature of 700–1200° C. for a short period of time thus integrating the blank and shank into a cutting tool. The instantaneous heating process is preferably a light heating process by a halogen lamp. A welding chamber for the blank controls both pressure and atmosphere, and is provided with a desired degree of vacuum. In this manner, a thermal deterioration of a diamond blank, a welding metal or a shank material is prevented.

9 Claims, 2 Drawing Sheets

METHOD OF MANUFACTURING DIAMOND CUTTING TOOLS THROUGH INSTANTANEOUS HEATING PROCESS AND COOLING PROCESS AND SUCH A DIAMOND CUTTING TOOL

TECHNICAL FIELD

The present invention relates, in general, to a method of manufacturing diamond cutting tools through an instantaneous heating process and a quick cooling process and to a diamond cutting tool manufactured by the method and, more particularly, to a method of manufacturing diamond cutting tools by integrating a shank and a blank together into a desired cutting tool or a desired abrasion resistant tool through an instantaneous heating process and a cooling process, with the blank being made of natural diamond, polycrystalline diamond (PCD), chemical vapor deposited (CVD) thick or thin diamond, or a cubic boron nitride (CBN), the present invention also relating to a diamond cutting tool produced through such a method.

BACKGROUND ART

As well known to those skilled in the art, diamond and cubic boron nitrides are optimum materials of putting tools since they have a high abrasion resistance and high machining properties.

A variety of materials, such as natural diamond, polycrystalline diamond (PCD) sintered with metal, chemical vapor deposited (CVD) thick diamond produced through a vapor deposition process, and polycrystalline cubic boron nitrides (PCBN), have been proposed and used as materials of such diamond cutting tools.

The above-mentioned materials for the diamond cutting tools have been typically prepared in the form of sheet blanks. That is, when a desired diamond cutting tool or a desired diamond dresser (hereinbelow, referred to simply as "diamond cutting tool" for ease of description) is produced using such materials, it is necessary to primarily prepare a sheet blank 1 made of diamond, PCBN or CVD thick diamond, and to firmly integrate the blank 1 with a shank 3 into a single body using a welding material 2 as shown in FIGS. 1 and 2. In such a diamond cutting tool, the welding material 2 is made of a welding metal alloy, while the shank 3 acts as a support of the cutting tool and is typically made of a cemented carbide (WC-Co alloy) or a tool steel.

In the above diamond cutting tool, the welding material 2, or the integration material used for jointing the blank 1 to the shank 3, also acts at a medium transmitting the cutting load to the shank 3, with the cutting load being generated between the blank 1 and a workpiece during a cutting operation of the tool. Therefore, it is necessary for the welding material 2 to have a high strength enough to effectively resist against such cutting load and to retain the integration of the blank 1 with the shank 3.

It has been thus noted that the technique of integrating the blank 1 with the shank 3 using such a welding material is a very important factor while producing such a diamond cutting tool.

In the prior art, such an integration has been accomplished through a welding process using a torch lamp or an induction heater.

However, such a conventional welding process of producing the diamond cutting tools has to be performed under the condition that the welding material is heated at a high temperature and is exposed to atmospheric air. The welding process thus undesirably oxidizes the welding layer, formed in a resulting tool by the welding material, and forms a plurality of pores in the structure of the welding layer. This finally reduces the physical properties of the resulting cutting tools. Another problem, derived in the conventional welding process, resides in that the process has to be performed manually and undesirably reduces productivity while producing such tools. The conventional welding process also allows the physical properties of resulting tools to be different from each other in accordance with producers of the tools. It is thus almost impossible for the welding process to produce diamond cutting tools having equal properties.

In an effort to overcome the above-mentioned problems, another welding process using a vacuum furnace has been proposed.

However, the welding process using such a vacuum furnace consumes a lengthy period of time, at least 8–10 hours, while raising and lowering the temperature to desired degrees. The above process thus undesirably requires a lengthy period of processing time while producing the cutting tools. During this welding process, the shank is undesirably heated at a welding temperature, and so the shank is reduced in mechanical strength. Therefore, the resulting tools of the above welding process are regrettably limited in use.

The above-mentioned problems of the conventional processes finally result in an increase in the production cost of diamond cutting tools.

It is thus necessary to provide a new welding process of producing diamond cutting tools, which reduces the processing cost, produces diamond cutting tools having equal properties, and allows such cutting tools to be automatically produced in commercial quantity, thus almost completely overcoming the problems derived in the conventional processes.

DISCLOSURE OF THE INVENTION

Accordingly, the present invention has been made keeping in mind the above problems occurring in the prior art, and an object of the present invention is to provide a method of manufacturing diamond cutting tools by heating both a diamond sheet blank and a welding material through an instantaneous heating process without heating a shank while appropriately controlling a welding atmosphere, thus integrating the blank with the shank into a desired diamond cutting tool and quickly producing a desired number of tools having equal properties.

In order to accomplish the above-mentioned object, the present invention uses a light heating process, using a halogen lamp, as the instantaneous heating process while producing diamond cutting tools. In the method of this invention, a welding chamber for blanks is designed to be controlled in both pressure and atmosphere so as to accomplish a desired degree of vacuum ranging from almost zero up to several ten Torr, thus accomplishing a desired atmosphere capable of preventing a thermal deterioration of a diamond blank, a welding metal or a shank material.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
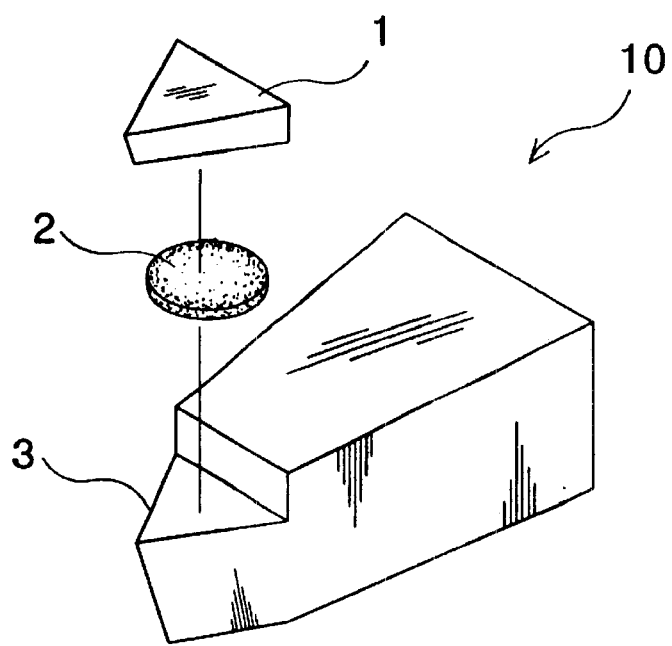
FIG. 1 is an exploded perspective view, showing a diamond or PCBN blank, a welding material and a shank of a cutting tool before they are welded together in a single structure.
Figure 2:
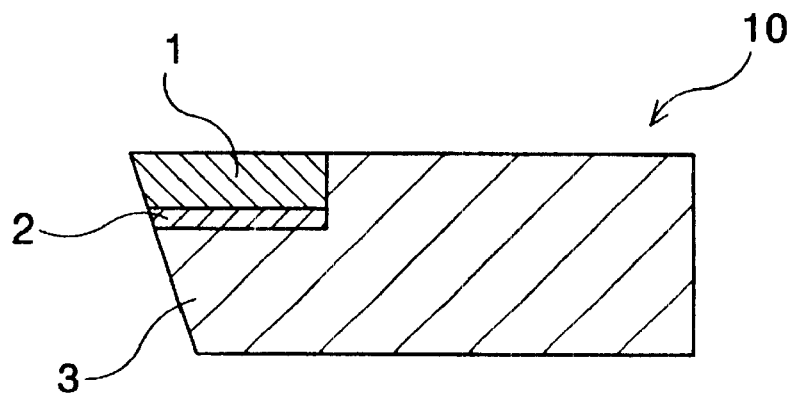
FIG. 2 is a vertical cross-sectioned view of the cutting tool of FIG. 1 after the parts are welded together into a desired tool
Figure 3:
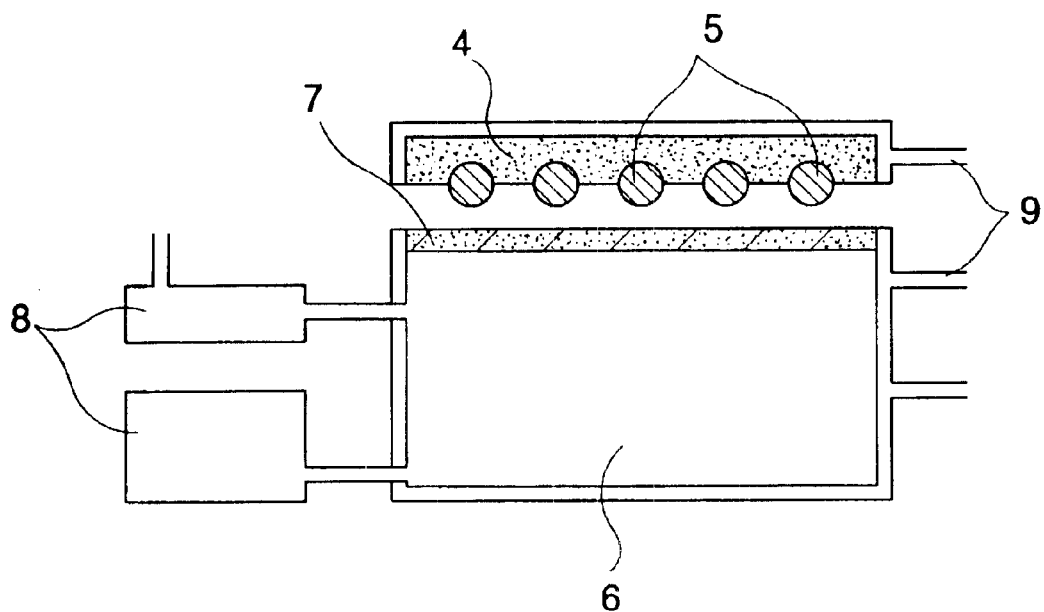
FIG. 3 is a schematic view, showing the construction of a welding machine used in the method according to the preferred embodiment of the present invention.

FIG. 3 schematically shows the construction of a welding machine, designed to weld a blank to a shank through an instantaneous heating process and a quick cooling process in the method of this invention.

As shown in the drawing, the welding machine comprises a heat source unit 4 having a plurality of heat sources 5. A welding chamber 6 is provided in the welding machine and is used for receiving tool pieces 10 to be welded therein. An atmosphere controller 8, such as a vacuum pump, is connected to the chamber 6 and controls the inner pressure of the chamber 6 so as to accomplish a desired degree of vacuum of the chamber 6.

In the above welding machine, the heat sources 5 of the unit 4 are light heating type heat sources and accomplish an instantaneous heating process wherein the heating temperature rises to a desired point instantaneously. In the present invention, it is preferable to use a halogen lamp as each heat source 5.

The welding machine of this invention is preferably coated with metal so as to effectively concentrate radiant heat from the halogen lamps 5 to the tool pieces 10 within the chamber 6.

In the present invention, the number of and the size of halogen lamps are preferably determined in accordance with the sizes of both the tool pieces 10 and the chamber 6.

Both the heat source unit 4 and the chamber 6 are designed to be water-cooled, with separate hydro-cooling structures 9 respectively connected to the unit 4 and the chamber 6. Due to the hydro-cooling structures 9, it is possible to prevent both the unit 4 and the chamber 6 from being unexpectedly overheated and to allow a quick lowering of temperature in the case of turning off the heat source unit 4.

That is, the heat source unit 4 is designed to be a separate unit independent from the welding chamber 6, and so the unit 4 is turned off. Therefore, it is possible to maximize the cooling rate of the welding machine.

A transparent silica window 7 forms a wall of the chamber 6, at which the chamber 6 faces the heat source unit 4. The above window 7 thus directly transmits radiant heat from the halogen lamps 5 to the tool pieces 10 within the welding chamber 6.

Within the chamber 6, the radiant heat, directly transmitted from the halogen lamps to the tool pieces 10 through the window 7, is very quickly transferred to a welding material 2 due to a high thermal conductivity of diamond, thus accomplishing a very effective welding operation. In such a case, the welding material 2 is made of a welding metal and is positioned under a diamond blank.

In such a welding process, it is possible for the atmosphere controller 8, such as a vacuum pump, to control the pressure and atmosphere of the chamber 6 so as to give a desired degree of vacuum ranging from 0.001 Torr to 20 Torr to the chamber 6.

Therefore, it is noted that the welding machine of this invention has a simple construction and is easily controlled during an operation.

The method of this invention, wherein a thin diamond blank is welded to a shank into a desired diamond cutting tool using the above-mentioned welding machine, is processed as follows.

First, a thick diamond film, manufactured through a vapor deposition process, is laid on a welding metal layer coated on a shank prior to be dried within a drier at a temperature of 200° C. for 10 minutes. A tool piece 10 is thus prepared.

After the drying step, the tool piece 10 is received in the chamber 6, and the atmosphere controller 8 is started to give a degree of vacuum ranging from 0.001 Torr to 0.01 Torr within the chamber 6.

The heat sources, or the halogen lamps 5 are, thereafter, turned on so as to heat the chamber 6 at a temperature of 250° C. for 10 minutes. This step removes impurities, such as organic impurities, from the welding metal 2 of the tool piece 10.

Thereafter, the temperature of the chamber 6 is instantaneously raised to 800° C. within 1 minute, and the chamber 6 is kept at the temperature of 800° C. for 3 minutes. After the chamber 6 is kept at that temperature for 3 minutes, the halogen lamps 5 are turned off so as to allow the temperature of the chamber 6 to be lowered to 150° C. within about 5–10 minutes.

For example, in order to maintain a desired reducing atmosphere within the chamber 6, hydrogen having a high purity (at least 99.99%) passes through sulfuric acid prior to flowing within the chamber 6. In addition, it is necessary to maintain a degree of vacuum of 2 Torr within the chamber 6.

Thereafter, the temperature of the chamber 6 is instantaneously raised to 800° C. within 1 minute, and the chamber 6 is kept at the temperature of 800° C. for 3 minutes. After the chamber 6 is kept at that temperature for 3 minutes, the halogen lamps 5 are turned off in the same manner as that described above, thus quickly lowering the temperature of the chamber 6.

Therefore, a diamond blank 1 is completely integrated with the shank 3 into a single structure.

The above-mentioned process of this invention effectively uses the thermal properties of diamond blanks 1.

That is, diamond has a high thermal conductivity and a low specific heat capacity in comparison with other materials, and so diamond is very quickly heated to a desired temperature. The diamond blank thus very quickly transfers heat to the welding metal 2. In addition, since the size of the diamond blank 1 is significantly smaller than the shank 3, the blank 1 has a low thermal capacity.

Due to such thermal properties of diamond blanks, it is possible to use such an instantaneous heating process in the method of this invention.

In the method of this invention, only the blank 1 and the welding metal 2 are heated to a melting point of the welding metal 2 through a light heating process, thus completely welding the blank 1 to the shank 3. During such a welding process, the shank 3 is not highly heated, but is maintained at a temperature slightly higher than room temperature due to its high thermal capacity.

Therefore, the tool piece 10 is free from a thermal deterioration, such as a thermal deformation due to a high temperature, and is quickly processed within a very short period of time during a welding process.

The above-mentioned method of this invention is also effectively used for manufacturing cutting tools using PCD (polycrystalline diamond) blanks or PCBN (polycrystalline cubic boron nitride) blanks through an instantaneous heating processs.

In such a case, the process of manufacturing PCD or PCBN cutting tools is performed in the same manner as that described for the diamond cutting tool while appropriately controlling the instantaneously raised temperature and the heating time in accordance with the size and thickness of the PCD blanks or the PCBN blanks.

In addition, the above-mentioned method of this invention is used for manufacturing diamond cutting tools using natural or synthetic diamond.

In such a case, it is necessary to slowly cool the tool piece for 1–2 hours in order to prevent a formation of cracks due to a difference in a coefficient of thermal expansion between diamond and welding metal during a cooling process.

INDUSTRIAL APPLICABILITY

As described above, the present invention provides a method of manufacturing diamond cutting tools. The method of this invention uses a welding machine designed to instantaneously heat both a diamond blank and welding metal at a high temperature for several seconds or several minutes using a new heat source and to be controlled in a degree of vacuum ranging from 0.001 Torr to 20 Torr. The method of this invention thus effectively manufactures diamond cutting tools in commercial quantity by welding diamond blanks or cubic boron nitride (CBN) blanks to cemented carbide shanks, nonferrous shanks or metal shanks.

The method of this invention uses a new heating process capable of reducing the total processing time to 20–60 minutes, thus manufacturing diamond cutting tools having a desired integration strength at the welded junction while almost completely preventing a thermal deterioration of the resulting tools.

The present invention completely automates the process of integrating blanks with shanks while manufacturing diamond cutting tools or PCBN (polycrystalline cubic boron nitride) cutting tools.

The present invention also provides a method of integrating polycrystalline diamond with a cemented carbide shank, thus improving productivity, operational performance and market competitiveness of diamond cutting tools. Another advantage of the method of this invention resides in that it effectively integrates diamond or PCBN with shanks, made of a variety of materials, thus being widely used for manufacturing diamond cutting tools.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a method of manufacturing a cutting tool comprising positioning a welding material between a blank and a shank and welding the blank to the shank with the welding material therebetween, the improvement comprising:

heating the blank, the shank and the welding material through an instantaneous heating process in an area wherein a temperature instantaneously rises at a rate of 500–1000° C./min.; and cooling the blank, the shank and the welding material by leaving them at a temperature of 700–1200° C. for a short period of time thus integrating the blank with the shank into the cutting tool.

2. The method according to claim 1, wherein the instantaneous heating process is performed using light heat emitted from a halogen lamp used as a heat source.

3. The method according to claim 1, wherein radiant heat, having an instantaneously rising temperature and being emitted from a heat source, is directly transferred to the blank through a transparent silica window.

4. The method according to claim 1, wherein a chamber is provided for carrying out an integration of the blank with the shank, said chamber having a low vacuum atmosphere with a degree of vacuum ranging from 0.001 Torr to 20 Torr.

5. The method according to claim 1, wherein said blank is a polycrystalline cubic boron nitride blank.

6. The method according to claim 1, wherein the heating is conducted so as to heat the blank and the welding material to a melting point of the welding material while a temperature of the shank is maintained at a temperature that is lower than said melting point.

7. The method according to claim 6, wherein the blank comprises a blank material selected from the group consisting of natural diamond, polycrystalline diamond, and polycrystalline cubic boron nitride.

8. The method according to claim 7, wherein the blank is a sheet of said blank material.

9. The method according to claim 7, wherein the shank comprises a cemented carbide or a tool steel.

* * * * *